(12) United States Patent
Peng et al.

(10) Patent No.: US 8,521,549 B2
(45) Date of Patent: Aug. 27, 2013

(54) METHODS AND SYSTEMS FOR RECOMMENDING VENDORS TO SUBMIT BIDS FOR A PRINT JOB

(75) Inventors: Wei Peng, Webster, NY (US); Shi Zhao, Rochester, NY (US); Sudhendu Rai, Fairport, NY (US); David Thomas Ashby, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 175 days.

(21) Appl. No.: 13/236,252

(22) Filed: Sep. 19, 2011

(65) Prior Publication Data

US 2013/0073298 A1    Mar. 21, 2013

(51) Int. Cl.
*G06Q 10/00* (2006.01)
(52) U.S. Cl.
USPC ....... 705/1.1; 705/26.3; 705/26.35; 705/26.4; 705/347
(58) Field of Classification Search
USPC .......................... 705/1.1, 26.3, 26.35, 4, 347
See application file for complete search history.

(56) References Cited

U.S. PATENT DOCUMENTS

2009/0281878 A1* 11/2009 Rane et al. ............ 705/11

OTHER PUBLICATIONS

Shuo Chen, "Learning to Predict Prices in a Supply Chain Management Game", Aug. 30, 2007, pp. 1-12, downloaded from: http://www.cra.org/Activities/craw_archive/dmp/awards/2007/Chen/report.pdf.*

* cited by examiner

*Primary Examiner* — Candice D Wilson
*Assistant Examiner* — Ehrin Pratt
(74) *Attorney, Agent, or Firm* — Fox Rothschild LLP

(57) ABSTRACT

A method of recommending vendors to bid on a print job may include identifying a print job for which a recommendation of vendors to bid on the print job is desired and identifying one or more vendors as potential bidders for the print job. The method may include, for each identified vendor, determining, by a computing device, a bidding probability associated with the vendor, a winning probability associated with the vendor, a recommendation probability associated with the vendor, and identifying the vendor as a recommended vendor based on the associated recommendation probability. The method may include notifying a user of the recommended vendors.

16 Claims, 2 Drawing Sheets

METHODS AND SYSTEMS FOR RECOMMENDING VENDORS TO SUBMIT BIDS FOR A PRINT JOB

BACKGROUND

Domain experts often rely on their own knowledge in assessing which vendors can provide the best prices and services. For example, vendors are typically chosen by domain experts based on a customer relationship and their job quality. However, this manual approach is subjective, and the vendors that are chosen often vary. In addition, the approach is time-consuming and error-prone, especially when choosing from a large group of vendors.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of recommending vendors to bid on a print job may include identifying a print job for which a recommendation of vendors to bid on the print job is desired and identifying one or more vendors as potential bidders for the print job. The method may include, for each identified vendor, determining, by a computing device, a bidding probability associated with the vendor, determining, by the computing device, a winning probability associated with the vendor, determining, by a computing device, a recommendation probability associated with the vendor, and identifying the vendor as a recommended vendor based on the associated recommendation probability. The bidding probability may represent a probability that the vendor will bid on the print job. The winning probability may represent a probability that the vendor will win a bid for the print job. The recommendation probability may represent a probability that the vendor will be recommended to bid on the print job. The recommendation probability may be based on the bidding probability and the winning probability associated with the vendor. The method may include notifying a user of the recommended vendors.

In an embodiment, a system of recommending vendors to bid on a print job may include a computing device and a computer-readable storage medium in communication with the computing device. The computer-readable storage medium may include one or more programming instructions for identifying a print job for which a recommendation of vendors to bid on the print job is desired, identifying one or more vendors as potential bidders for the print job, and, for each identified vendor, determining a bidding probability associated with the vendor, determining a winning probability associated with the vendor, determining a recommendation probability associated with the vendor, and identifying the vendor as a recommended vendor based on the associated recommendation probability. The computer-readable storage medium may include one or more programming instructions for notifying a user of the recommended vendors. The bidding probability may represent a probability that the vendor will bid on the print job. The winning probability may represent a probability that the vendor will win a bid for the print job. The recommendation probability may represent a probability that the vendor will be recommended to bid on the print job. The recommendation probability may be based on the bidding probability and the winning probability associated with the vendor.

DETAILED DESCRIPTION

A "print job" refers to a job that can be processed by a print device. For example, a print job may include a job that is to be printed, scanned or otherwise processed by a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "print attribute" is a print-related feature of a print job. A print attribute may include a size of the print job, a quantity of the print job, a print job type and/or the like.

A "print job type" refers to a combination of print job functions required to process a print job.

A "historical print job" is a print job that has been previously processed by a print shop, a theoretical print job that may be processed by a print shop, a benchmark print job processed by a print shop and/or the like.

A "vendor" is an individual, organization, entity and/or the like that is capable of processing print jobs.

A "bidding probability" is a probability associated with a vendor bidding or not bidding to perform a print job.

A "winning probability" is a probability associated with a vendor winning a bid for a print job.

A "recommendation probability" is a probability that a vendor will be recommended to bid a print job.

Figure 1:
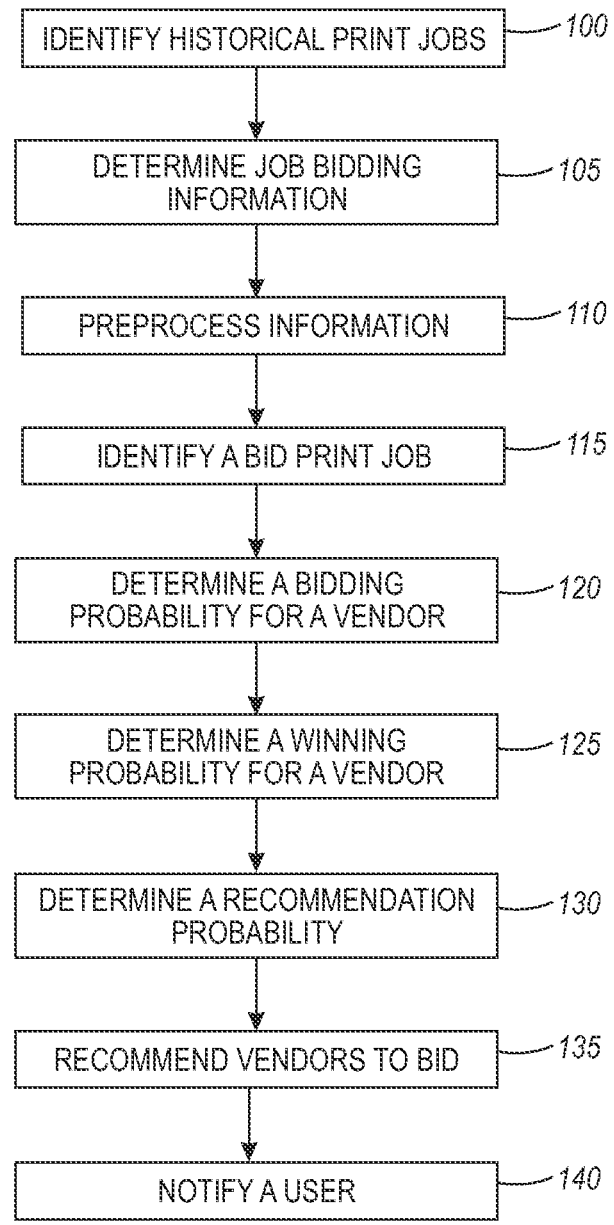
FIG. 1 illustrates an exemplary method of recommending one or more vendors to bid on a job according to an embodiment.

FIG. 1 illustrates an exemplary method of recommending one or more vendors to bid on a job according to an embodiment. As illustrated by FIG. 1, a plurality of historical print jobs may be identified 100. In an embodiment, one or more historical print jobs may be identified 100 based on information received from one or more databases, print devices and/or the like. In an embodiment, one or more historical print jobs that are processed over a time period may be identified 100. For example, one or more historical print jobs that are processed over a one week period, a one month period and/or the like may be identified 100. Additional and/or alternate time periods may be used within the scope of this disclosure.

In an embodiment, one or more historical print jobs may be associated with one or more print attributes. Exemplary print attributes may include a job identifier, a job status, an invoice price, an awarded vendor name, a job name, a buyer identifier, an order due date, an invoice quantity, a job type, a number of pages, a press type, an invoice color front, an invoice flat width, a varnish type, an invoice flat width, an invoice flat height, a finished invoice flat width, a finished invoice flat height, a sheet length, a gross impression, a fold type, a job description, a number of folds, a gluestripping type, a bindery type, a paper weight, a paper finish, a paper grade, an awarded vendor name, a final invoice price, an invoice job price and/or the like. Table 1 illustrates exemplary print job attributes associated with five print jobs according to an embodiment.

and/or the like. For example, job bidding information may include a bid identifier, a vendor's name, a job identifier associated with the job being bid, a date that a bid was created, a price associated with the bid and/or the like. Table 2 illustrates exemplary job bidding information for two historical print jobs according to an embodiment.

TABLE 2

| Bid ID | Vendor Name | Job ID | Date Created | Bid Price |
|---|---|---|---|---|
| 87861 | Vendor A | 33362 | Oct. 14, 2008 13:29 | 0 |
| 87862 | Vendor B | 33362 | Oct. 14, 2008 14:19 | 1.00E+12 |
| 87907 | Vendor C | 33362 | Oct. 14, 2008 8:29 | 0 |

TABLE 1

| | Job ID | | | | |
|---|---|---|---|---|---|
| | 45450 | 46215 | 44796 | 43867 | 45229 |
| Job Name | 46140-Data capture form | 42199-Policy provisions | 6586-12.06 Version | 43536-Monthly inventory update | 46851-Oversize C5 Mailing Wallets |
| Buyer ID | Buyer A | Buyer B | Buyer C | Buyer D | Buyer E |
| Job Close Date | Date A | Date B | Date C | Date D | Date E |
| Invoice Quantity | 2,000 | 15,000 | 150,000 | 8,000 | 0 |
| Job Type | Prepress and print | Book | Open Item Spec | Book | Quantity Bases |
| Pages | N/A | 32 | N/A | 24 | N/A |
| Press Type | B2 | B2 | N/A | B2 | N/A |
| Invoice Colors Front | 1 | 1 | N/A | 4 | N/A |
| Invoice Colors Back | 1 | 1 | N/A | 4 | N/A |
| Varnish | No varnish | No varnish | N/A | No varnish | N/A |
| Invoice Flat Width | 420 | 148 | N/A | 210 | N/A |
| Invoice Flat Height | 594 | 210 | N/A | 297 | N/A |
| Invoice Finished Width | 210 | 148 | N/A | 210 | N/A |
| Invoice Finished Height | 297 | 210 | N/A | 297 | N/A |
| Fold Type | Signature | Signature | N/A | Signature | N/A |
| Number of Folds | 2 | 3 | N/A | 2 | N/A |
| Bindery Type | Saddle | Saddle | N/A | Saddle | N/A |
| Invoice Paper Weight | GSM100 | GSM100 | N/A | GSM135 | N/A |
| Invoice Paper Finish | Uncoated | Uncoated | N/A | Uncoated | N/A |
| Invoice Paper Grade | Premium | Premium | N/A | Premium | N/A |
| Awarded Vendor Name | Vendor A | Vendor B | Vendor D | Vendor D | Vendor E |
| Final Invoice Price | 342.00 | 1,706.00 | 921.00 | 2,095.27 | 1,259.20 |
| Invoice Job Price | 311.26 | 1,699.13 | 0.00 | 1,835.27 | 1,349.20 |

In an embodiment, job bidding information associated with the identified historical print jobs may be determined 105. In an embodiment, job bidding information may be retrieved from a database and/or other computer storage medium. Job bidding information may include information associated with one or more vendors who bid on a historical print job, who were asked to bid on a historical print job TABLE 2-continued

| Bid ID | Vendor Name | Job ID | Date Created | Bid Price |
|---|---|---|---|---|
| 87913 | Vendor D | 33362 | Oct. 15, 2008 13:23 | 0 |
| 87949 | Vendor E | 33362 | Oct. 16, 2008 10:16 | 389.34 |

TABLE 2-continued

| Bid ID | Vendor Name | Job ID | Date Created | Bid Price |
|---|---|---|---|---|
| 87950 | Vendor E | 33362 | Oct. 16, 2008 10:25 | 389.34 |
| 87982 | Vendor F | 33362 | Oct. 17, 2008 7:47 | 0 |
| 87997 | Vendor G | 33362 | Oct. 17, 2008 9:05 | 451.9 |
| 88003 | Vendor H | 33363 | Oct. 17, 2008 9:42 | 0 |
| 88016 | Vendor G | 33363 | Oct. 17, 2008 10:30 | 309.7 |
| 87904 | Vendor A | 33363 | Oct. 15, 2008 7:15 | 1,118.26 |
| 87916 | Vendor B | 33363 | Oct. 15, 2008 14:10 | 0 |
| 87931 | Vendor C | 33363 | Oct. 15, 2008 16:59 | 0 |
| 87953 | Vendor C | 33363 | Oct. 16, 2008 10:42 | 2,951.54 |
| 87983 | Vendor D | 33363 | Oct. 17, 2008 7:54 | 0 |
| 88004 | Vendor E | 33363 | Oct. 17, 2008 9:25 | 3,712.50 |
| 88017 | Vendor D | 33363 | Oct. 17, 2008 10:31 | 2,127.46 |
| 88031 | Vendor F | 33363 | Oct. 17, 2008 10:50 | 2,854.02 |
| 88084 | Vendor C | 33363 | Oct. 17, 2008 13:09 | 0 |
| 88146 | Vendor G | 33363 | Oct. 17, 2008 16:14 | 2,362.01 |

In an embodiment, historical print job information and/or job bidding information may be preprocessed 110 to generate updated historical print job information and/or updated job bidding information. Preprocessing may involve formatting data for consistency, filtering out data, linking data and/or the like. For example, print attributes that are not relevant to analyzing bidders may be excluded during a preprocessing operation. By way of example, print attributes, such as job description, job name, job creation date and/or the like, may not be relevant to analyzing bidders and may be removed from historical print job information during a preprocessing operation.

In an embodiment, print jobs that are identified as historical print jobs but which do not appear in the bidding information may be filtered out. Similarly, print jobs that appear in the bidding information but not in the identified historical print jobs may be filtered out. In an embodiment, extremely high bidding prices or bid prices of zero may be filtered out. These situations may be regarded as "no bid" situations meaning that the associated vendor was not selected to bid on the corresponding job or did not submit a bid. In an embodiment, duplicate bids for the same print job may be removed. In an embodiment, historical print job information and job bidding information may be linked by the associated job identifier.

In an embodiment, a bid print job may be identified 115. In an embodiment, a bid print job may be a print job for which recommended vendors are to be determined. A bid print job may be a new print job that a customer has requested be processed. In an embodiment, a bid print job may be a theoretical print job, a benchmark print job and/or the like to be processed in the future.

In an embodiment, a bidding probability may be determined 120 for one or more vendors. A bidding probability may be a probability that a particular vendor will bid on a bid print job if given the opportunity. In another embodiment, a bidding probability may be a probability that a vendor will not bid on a bid print job if given the opportunity. A bidding probability may be determined 120 using the Naïve Bayes algorithm. For example, a probability that a vendor is not going to bid on a print job may be represented by the following:

$$P(E|V, J) = \frac{P(J|E, V)P(E|V)P(V)}{P(V, J)} = \frac{\prod_i P(f_i|E, V)P(E|V)}{P(V, J)},$$

where,
V is a vendor,
J is a print job, and
each $f_i$ is a print attribute.

In an embodiment, a probability that a vendor is going to bid on a print job may be represented by the following:

$$P(N|V, J) = \frac{P(J|N, V)P(N|V)P(V)}{P(V, J)}$$

In an embodiment, the sum of a probability that a vendor is not going to bid on a print job and a probability that the vendor is going to bid on the print job may be equal to '1.' In other words, P(E|V, J)+P(N|V, J)=1.

In an embodiment, a bidding probability may be based on historical print job information. For example, one or more print attributes of a bid print job may be compared to the corresponding print attributes of one or more historical print jobs to determine a bidding probability for one or more vendors. For example, if a print job is to be printed and bound, these print attributes may be compared to historical print jobs that also required printing and binding to determine which vendors have previously bid on these print jobs. In an embodiment, a probability of a vendor bidding on a print job having a certain attribute may be determined using historical print job information. For example, a probability of a vendor bidding on a print job may be based on a probability of the vendor bidding on a historical print job having one or more of the print attributes of the bid print job.

Table 1 illustrates an exemplary description of historical print jobs that have been bid on by a vendor. For example, as shown by Table 1, Vendor A has bid on 80% of historical print jobs requiring color printing. Similarly, Vendor B has bid on 70% of historical print jobs requiring black and white printing.

TABLE 1

| | Color print | Black-white print | Book | Prepress |
|---|---|---|---|---|
| Vendor A | 80% | 20% | 30% | 70% |
| Vendor B | 30% | 70% | 20% | 80% |
| Vendor C | 40% | 35% | 20% | 25% |
| Vendor D | 75% | 30% | 10% | 50% |

In an embodiment, a bidding probability associated with a vendor may be based on one or more probabilities of the vendor bidding on a historical print job having one or more of the print attributes of the bid print job. For example, a bid print job may be a book and may require color printing. As illustrated by Table 1, the probability of Vendor A bidding on a print job requiring color printing is 80% and that is a book is 30%. In an embodiment, these percentages may be used to determine a probability that Vendor A will bid on the bid print job having both print attributes.

Table 2 illustrates exemplary bidding probabilities associated with vendors based on the probability of the vendor bidding on one or more print attributes of a bid print job. For example, as illustrated by Table 2, a bid print job that is for a book and that requires color printing has a 56% probability of being bid on by Vendor A, a 6% probability of being bid on by Vendor B, a 15% probability of being bid on Vendor C and a 32% probability of being bid on by Vendor D. Additional and/or alternate probabilities and/or combinations of print attributes may be used within the scope of this disclosure.

TABLE 2

|  | Color Print | Book | Bidding Probability |
|---|---|---|---|
| Vendor A | 80% | 30% | 56% |
| Vendor B | 30% | 20% | 6% |
| Vendor C | 40% | 20% | 15% |
| Vendor D | 75% | 10% | 32% |

In an embodiment, print attributes that may be considered in determining 120 a bidding probability associated with a vendor may include one or more of a press type, a paper weight, color used on the front of a print job, color used on the back of a print job, a sheet length, a identifier associated with a buyer, a sheet width, a run type, a flat weight, a flat height, a number of folds, a trim type, a number of pages and/or a quantity of print jobs.

In an embodiment, a winning probability may be determined 125 for one or more vendors. In an embodiment, a winning probability may be a probability that a vendor will win a bid on a print job. In an embodiment, a winning probability may be determined 125 using the Naïve Bayes algorithm. For example, a winning probability may be represented by the following:

$$P(V_w|J) = \frac{P(J|V_w)P(V_w)}{P(J)} = \frac{\prod_i P(f_i|V_w)P(V_w)}{P(J)},$$

where $V_w$ represents the vendor that wins job J.

In an embodiment, other classification algorithms such as support vector machine, logistic regression and/or the like, may be used to determine 125 a winning probability.

In an embodiment, a recommendation probability may be determined 130 for one or more vendors. A recommendation probability may be a probability associated with recommending a vendor to bid on a print job. In an embodiment, a recommendation probability may be determined 130 using linear pooling. In an embodiment, a bidding probability associated with a vendor and a winning probability associated with the vendor may be combined linearly according to linear pooling according to an embodiment. For example, a recommendation probability associated with vendor $V_i$ may be represented by:

$$RP(V_i) = BP(V_i) + \beta * WP(V_i),$$

where: $BP(V_i)$ is the bidding probability associated with $V_i$;

$WP(V_i)$ is the winning probability associated with $V_i$; and $\beta$ is a weight by which a vendor should be ranked highly In an embodiment, predicting a bidding probability and a winning probability separately for a vendor and then combining them to determine 130 a recommendation probability may help ensure that the vendor having the highest probability to win a bid is included in a group of recommended vendors and ranked highly within that group.

In an embodiment, one or more vendors may be recommended 135 to a user for a bid print job. The recommended vendors may include one or more vendors having a recommendation probability that exceeds a threshold value. For example, vendors having a recommendation probability that exceeds 50% may be recommended to a user. Additional and/or alternate threshold values may be used within the scope of this disclosure.

In an embodiment, a user may be notified 140 of one or more of the recommended vendors. For example, the recommended vendors and/or the recommendation probabilities associated with the recommended vendors may be displayed to a user on a display device, such as a computer monitor. In an embodiment, recommended vendors and/or the recommendation probabilities associated with the recommended vendors may be emailed, faxed or otherwise transmitted to a user.

In an embodiment, a bid request may be automatically prepared for each of the recommended vendors. The bid request may include information about the bid print job such as print attributes of the bid print job. In an embodiment, the bid request may include a date by which bids are to be received, contact information for questions, and/or other information.

In an embodiment, a bid request may be automatically sent to one or more recommended vendors. For example, a bid request may be automatically emailed to a recommended vendor.

Figure 2:
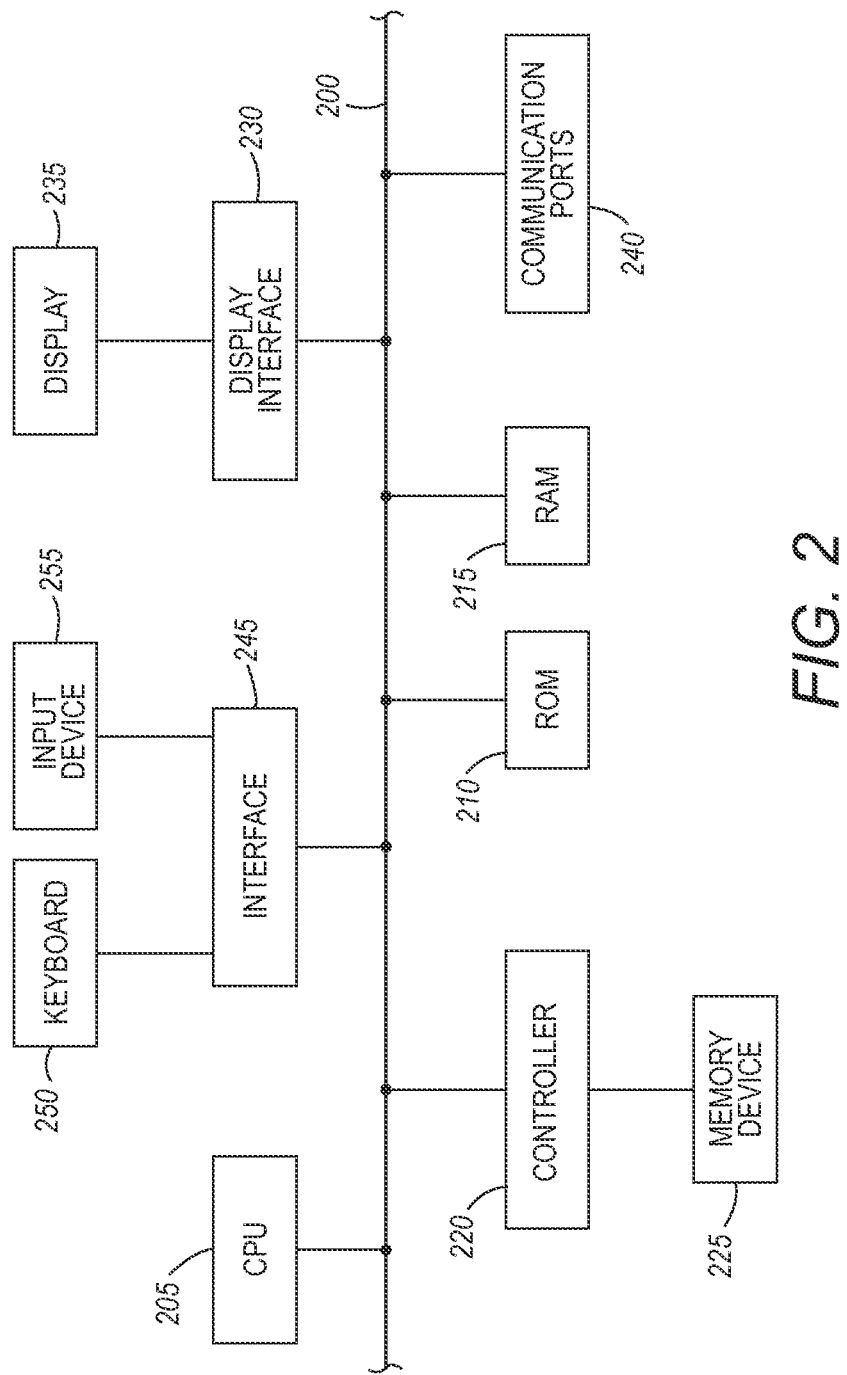
FIG. 2 illustrates a block diagram of exemplary internal hardware that may be used to contain or implement program instructions according to an embodiment.

FIG. 2 depicts a block diagram of exemplary internal hardware that may be used to contain or implement program instructions. A bus 200 serves as the main information highway interconnecting the other illustrated components of the hardware. CPU 205 is the central processing unit of the system, performing calculations and logic operations required to execute a program. CPU 205, alone or in conjunction with one or more of the other elements disclosed in FIG. 2, is an exemplary processing device, computing device or processor as such terms are used within this disclosure. Read only memory (ROM) 210 and random access memory (RAM) 215 constitute exemplary memory devices.

A controller 220 interfaces with one or more optional memory devices 225 to the system bus 200. These memory devices 225 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 210 and/or the RAM 215. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 230 may permit information from the bus 200 to be displayed on the display 235 in audio, visual, graphic or alphanumeric format. Communication with external devices, such as a printing device, may occur using various communication ports 240. An exemplary communication port 240 may be attached to a communications network, such as the Internet or an intranet.

The hardware may also include an interface 245 which allows for receipt of data from input devices such as a keyboard 250 or other input device 255 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of recommending vendors to bid on a print job, the method comprising:
   identifying a print job for which a recommendation of vendors to bid on the print job is desired;
   identifying one or more vendors as potential bidders for the print job;
   for each identified vendor:
      determining, by a computing device, a bidding probability associated with the vendor, wherein the bidding probability represents a probability that the vendor will bid on the print job,
      determining, by the computing device, a winning probability associated with the vendor, wherein the winning probability represents a probability that the vendor will win a bid for the print job,
      determining, by a computing device, a recommendation probability associated with the vendor, wherein the recommendation probability represents a probability that the vendor will be recommended to bid on the print job, wherein the recommendation probability is based on the bidding probability and the winning probability associated with the vendor, and
      identifying the vendor as a recommended vendor based on the associated recommendation probability; and
   notifying a user of the recommended vendors.

2. The method of claim 1, wherein identifying one or more vendors comprises analyzing job bidding information associated with one or more historical print jobs.

3. The method of claim 1, wherein determining a recommendation probability comprises determining the bidding probability associated with the vendor by:
   for one or more print attributes associated with the print job, determining an attribute probability that the vendor will bid on the print job, wherein the attribute probability is based on the vendor's previous bids for historical print jobs having the print attribute; and
   determining a bidding probability based on each attribute probability.

4. The method of claim 3, wherein determining a bidding probability comprises using a Naïve Bayes algorithm.

5. The method of claim 1, wherein determining a recommendation probability comprises:
   determining an adjusted winning probability by multiplying the winning probability by a coefficient; and
   summing the bidding probability and the adjusted winning probability.

6. The method of claim 1, wherein identifying the vendor as a recommended vendor comprises:
   in response to the recommendation probability associated with the vendor exceeding a threshold value, identifying the vendor as a recommended vendor.

7. The method of claim 1, wherein notifying a user comprises one or more of:
   displaying one or more of the recommended vendors and the corresponding recommendation probabilities to the user; and
   emailing one or more of the recommended vendors and the corresponding recommendation probabilities to the user.

8. The method of claim 1, further comprising:
   automatically preparing a bid request for each recommended vendor.

9. A system of recommending vendors to bid on a print job, the system comprising:
   a computing device; and
   a computer-readable storage medium in communication with the computing device, wherein the computer-readable storage medium comprises one or more programming instructions for:
      identifying a print job for which a recommendation of vendors to bid on the print job is desired,
      identifying one or more vendors as potential bidders for the print job, for each identified vendor:
         determining a bidding probability associated with the vendor, wherein the bidding probability represents a probability that the vendor will bid on the print job,
         determining a winning probability associated with the vendor, wherein the winning probability represents a probability that the vendor will win a bid for the print job,
         determining a recommendation probability associated with the vendor, wherein the recommendation probability represents a probability that the vendor will be recommended to bid on the print job, wherein the recommendation probability is based on the bidding probability and the winning probability associated with the vendor, and
         identifying the vendor as a recommended vendor based on the associated recommendation probability, and
      notifying a user of the recommended vendors.

10. The system of claim 9, wherein the one or more programming instructions for identifying one or more vendors comprises one or more programming instructions for analyzing job bidding information associated with one or more historical print jobs.

11. The system of claim 9, wherein the one or more programming instructions for determining a recommendation probability comprise one or more programming instructions for determining the bidding probability associated with the vendor by:
    for one or more print attributes associated with the print job, determining an attribute probability that the vendor will bid on the print job, wherein the attribute probability is based on the vendor's previous bids for historical print jobs having the print attribute; and
    determining a bidding probability based on each attribute probability.

12. The system of claim 11, wherein the one or more programming instructions for determining a bidding probability comprise one or more programming instructions for using a Naïve Bayes algorithm.

13. The system of claim 9, wherein the one or more programming instructions for determining a recommendation probability comprise one or more programming instructions for:
    determining an adjusted winning probability by multiplying the winning probability by a coefficient; and
    summing the bidding probability and the adjusted winning probability.

14. The system of claim 9, wherein the one or more programming instructions for identifying the vendor as a recommended vendor comprise one or more programming instructions for:
    in response to the recommendation probability associated with the vendor exceeding a threshold value, identifying the vendor as a recommended vendor.

15. The system of claim 9, wherein the one or more programming instructions for notifying a user comprise one or more programming instructions for performing one or more of:

displaying one or more of the recommended vendors and the corresponding recommendation probabilities to the user; and emailing one or more of the recommended vendors and the corresponding recommendation probabilities to the user.

16. The system of claim 9, wherein the computer-readable storage medium comprises further comprises one or more programming instructions for:

automatically preparing a bid request for each recommended vendor.

* * * * *